UNITED STATES PATENT OFFICE.

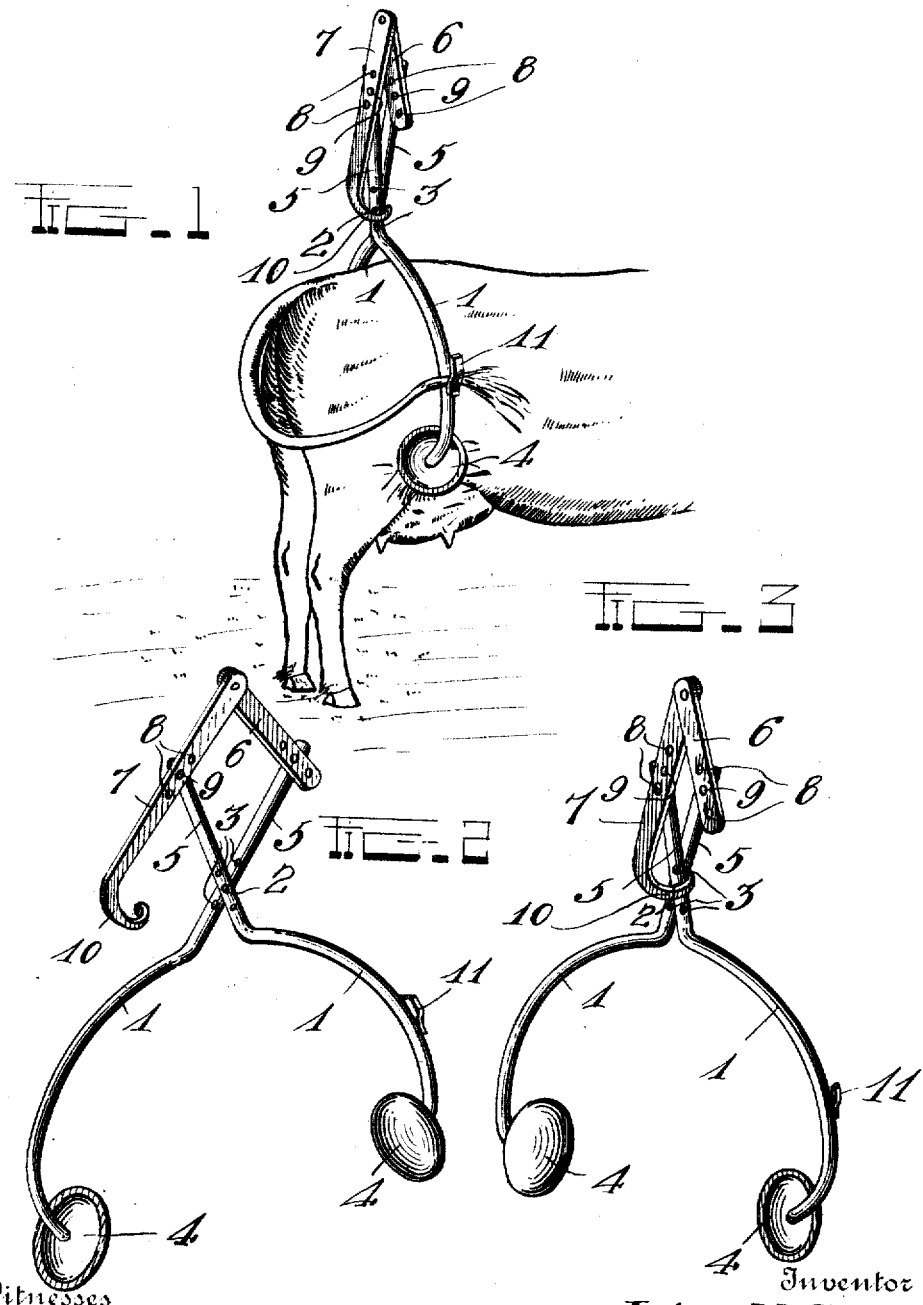

JOHN H. SCHIMKE, OF MANISTEE, MICHIGAN.

ANTIKICKING DEVICE FOR COWS.

1,012,165.   Specification of Letters Patent.   Patented Dec. 19, 1911.

Application filed July 13, 1911. Serial No. 638,321.

*To all whom it may concern:*

Be it known that I, JOHN H. SCHIMKE, a citizen of the United States, residing at Manistee, in the county of Manistee and State of Michigan, have invented certain new and useful Improvements in Antikicking Devices for Cows; and I do declare the following to be a full, clear, and exact description of the invention, such as will enable others skilled in the art to which it appertains to make and use the same.

This invention relates to improvements in anti-kicking devices for cows.

One object of the invention is to provide an improved device of this character which may be qucikly and easily applied to a cow and which when applied will positively prevent moving about or kicking and which will not injure nor irritate the animal.

Another object is to provide a device of this character having means whereby the tail of the animal may be securely held against switching.

With these and other objects in view, the invention consists of certain novel features of construction, and the combination and arrangement of parts as will be more fully described and claimed.

In the accompanying drawings: Figure 1 is a perspective view showing the application of the invention; Fig. 2 is a similar view of the device removed and showing the parts in open position; Fig. 3 is a similar view showing the parts closed.

My improved anti-kicking device is constructed somewhat similar to a pair of tongs and comprises a pair of gripping arms 1, which are adjustably and pivotally connected together by a pivot bolt 2 adapted to be engaged with a series of pivot holes 3 formed in the arms as shown. The arms are curved outwardly or shaped to fit around the back and thighs of the animal and have on their outer ends curved gripping disks 4 which are adapted to be engaged with the flanks of the animal as shown. On the pivoted ends of the arms are formed handles 5 whereby said arms are operated. To the outer ends of the arms 5 are pivotally and adjustably connected a pair of toggle levers 6 and 7, said levers being provided with a series of pivot holes 8 adapted to receive pivot bolts 9 whereby the levers are adjustably as well as pivotally connected to the ends of the arms. One of the toggle levers 7 is extended and has its end reduced and bent to form a laterally projecting hook 10 which is adapted to be sprung into engagement with one of the arms 5 when said levers are operated to bring the arms 1 into operative engagement with the opposite sides of the animal's body. On the outer edge of one of the arms 1 is secured a tail fastening clip 11 with which the tail of the animal is adapted to be engaged and the tail thereby prevented from being switched into the face of the person milking the cow. The arms 1 and handles 5 may be constructed of any suitable material and are here shown and are preferably formed from tubular metal bars.

In the application of the device the arms 1 are opened to the position shown in Fig. 2 of the drawings after which said arms are engaged with the back and opposite sides of the animal whereupon the handles 5 are brought together by means of the toggle levers 6 and 7, thus forcing the disks 4 into engagement with the flanks as clearly shown in Fig. 1 of the drawings. When the disks are thus pressed into position it will be impossible for the animal to raise either hind leg thus preventing kicking. When the device is applied in the manner described, the tail may be engaged with the clip 11 and thus prevented from being switched into the face of the milker.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

Having thus described my invention, what I claim is:

1. An anti-kicking device for cows comprising a pair of gripping arms pivotally connected intermediately of their ends, gripping disks secured to one end of said arms and adapted to be engaged with the flanks of the animal, toggle levers pivoted on the other ends of said arms whereby said arms are operated, one of said levers being provided with means for engagement with one of said arms whereby said arms are secured in engagement with the body of the animal.

2. An anti-kicking device for cows comprising a pair of pivotally and adjustably connected gripping arms, a pivot bolt to pivotally and adjustably connect said arms together, said arms being curved to conform to the shape of the animal's body, gripping disks secured to the ends of said arms, handles arranged on the outer ends of the arms, toggle levers pivotally and adjustably connected to said handles whereby the latter and said arms are operated, one of said levers being extended, a hook formed on the outer end of said extended lever, said hook being adapted to be engaged with one of the gripping arms.

In testimony whereof I have hereunto set my hand in presence of two subscribing witnesses.

JOHN H. SCHIMKE.

Witnesses:
A. F. RICHMOND,
FRED NYBRO.